US007796778B2

(12) United States Patent
Hsieh et al.

(10) Patent No.: US 7,796,778 B2
(45) Date of Patent: *Sep. 14, 2010

(54) DIGITAL WATERMARKING SYSTEM ACCORDING TO BACKGROUND IMAGE PIXEL BRIGHTNESS VALUE AND DIGITAL WATERMARKING METHOD

(75) Inventors: Kuan-Hong Hsieh, Shenzhen, Guangdong (CN); Xiao-Fang Chen, Shenzhen, Guangdong (CN); Zai-An Pan, Shenzhen, Guangdong (CN)

(73) Assignees: Hong Fu Jin Precision Industry (Shen Zhen) Co., Ltd., Longhua Town, Bao'an District, Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1133 days.

This patent is subject to a terminal disclaimer.

(21) Appl. No.: 11/308,958

(22) Filed: May 29, 2006

(65) Prior Publication Data
US 2006/0285721 A1 Dec. 21, 2006

(30) Foreign Application Priority Data
Jun. 17, 2005 (CN) .................. 2005 1 0035417

(51) Int. Cl.
*G06K 9/00* (2006.01)
(52) U.S. Cl. ..................................... 382/100
(58) Field of Classification Search ................ 382/100, 382/276, 232; 713/176; 358/329
See application file for complete search history.

(56) References Cited

U.S. PATENT DOCUMENTS

| 5,825,892 | A | | 10/1998 | Braudaway et al. |
| 5,875,249 | A | * | 2/1999 | Mintzer et al. ................. 380/54 |
| 6,222,932 | B1 | * | 4/2001 | Rao et al. .................... 382/100 |

(Continued)

FOREIGN PATENT DOCUMENTS

CN 1455578 11/2003

OTHER PUBLICATIONS

Yu-Chee Tseng; Yu-Yuan Chen; Hsiang-Kuang Pan, "A secure data hiding scheme for binary images," Communications, IEEE Transactions on , vol. 50, No. 8, pp. 1227-1231, Aug. 2002.*

(Continued)

*Primary Examiner*—Vu Le
*Assistant Examiner*—Andrae S Allison
(74) *Attorney, Agent, or Firm*—Winston Hsu

(57) ABSTRACT

A digital watermarking system and method is provided. The digital watermarking system mainly includes a storing unit, a background image obtaining module, a pixel determining module, an encrypting module, and a storing module. The storing unit is for storing text information, the text information including textual information and one or more background images. The background image obtaining module is for obtaining one background image to be watermarked from the storing unit. The background image includes plural pixels, and each of the pixels has a brightness value. The pixel determining module is for earmarking the pixel to be adjusted, an initial brightness value of the earmarked pixel being in a predetermined range. The encrypting module is for adjusting the brightness value of the earmarked pixel. The storing module is for storing watermarked text information in the storing unit. Related methods are provided.

8 Claims, 9 Drawing Sheets

U.S. PATENT DOCUMENTS

| | | | |
|---|---|---|---|
| 6,456,393 B1 * | 9/2002 | Bhattacharjya et al. | 358/1.9 |
| 6,519,350 B1 * | 2/2003 | Van Overveld et al. | 382/100 |
| 6,608,935 B2 * | 8/2003 | Nagumo et al. | 382/233 |
| 6,757,405 B1 * | 6/2004 | Muratani et al. | 382/100 |
| 6,850,626 B2 | 2/2005 | Rhoads et al. | |
| 7,113,612 B2 * | 9/2006 | Sugahara et al. | 382/100 |
| 7,164,779 B2 * | 1/2007 | Yerazunis et al. | 382/100 |
| 7,324,662 B2 * | 1/2008 | Kot et al. | 382/100 |
| 7,436,977 B2 * | 10/2008 | Wang et al. | 382/100 |
| 2001/0009581 A1 | 7/2001 | Hashimoto | |
| 2003/0204812 A1 * | 10/2003 | Hayashi | 715/500 |

OTHER PUBLICATIONS

Min Wu, Edward Tang and Bede Liu, "Data Hiding in Digital Binary Image", IEEE International Conference on Multimedia and Expo., 2000, pp. 393-396.*

* cited by examiner

DIGITAL WATERMARKING SYSTEM ACCORDING TO BACKGROUND IMAGE PIXEL BRIGHTNESS VALUE AND DIGITAL WATERMARKING METHOD

TECHNICAL FIELD

The present invention relates to a digital rights protection system and method, and particularly to a digital watermarking system according to background image pixel brightness value and digital watermarking method.

GENERAL BACKGROUND

Pirating of digitally-formatted works have been a significant obstacle towards the widespread adoption and use of the Internet for distribution of media such as books, musical works, and motion pictures. Although such network distribution would at first glance seem ideal for these media, which are easily represented in electronic format, there has been no easy way to prevent widespread illegal copying of such works once they are introduced to the public. In many cases, a person will buy a legitimate copy and then distribute illegal copies thereof to friends and others without any further payments to the publisher. This threatens the financial well-being of the publishers, and makes them very reluctant to introduce their works through the Internet.

Therefore, in an attempt to solve the above described problems, digital watermarking has been developed. In general, digital watermarking is an alteration of a data set within an electronic file. The watermark can be visible or invisible to the naked human eye.

The invisible, or nearly invisible, watermark is mainly detected by a computer. The computer computes a correlation of the information under scrutiny with an applied watermark pattern, and compares the result of the correlation with a predetermined threshold. If the difference is greater than the threshold, the watermark is said to be present; otherwise, it is said to be absent. The greater the difference, the more reliable the detection. However, with respect to works embedded with such a watermark, a great deal of computing is needed to detect the watermark and identify copyright notices and/or other verification messages in these works. In addition, once these works are printed, it becomes more difficult to accurately read or interpret information contained in the watermark, due to the imperceptible characteristics of the watermark.

What is needed, therefore, is a digital watermarking system and method, which can efficiently watermark text information including background images and generate a perceptible watermark.

SUMMARY

A digital watermarking system is provided. The digital watermarking system mainly includes a storing unit, a background image obtaining module, a pixel determining module, an encrypting module, and a storing module. The storing unit is for storing text information, the text information including textual information and one or more background images. The background image obtaining module is for obtaining a background image to be watermarked from the storing unit. The background image includes a plurality of pixels, and each of the pixels has a brightness value. The pixel determining module is for earmarking the pixel to be adjusted to obtain a watermark and for initializing a brightness value of the earmarked pixel to a predetermined range. The encrypting module is for adjusting the brightness value of the earmarked pixel, and the adjustment can be either an increasing or a decreasing brightness value. The storing module is for storing watermarked text information in the storing unit.

A digital watermarking method is also provided. The method includes the steps of: (a) obtaining text information to be watermarked, the text information including one or more background images each of which includes a plurality of pixels, and each pixel having a brightness value; (b) earmarking the pixel to be adjusted to obtain a watermark, an initial brightness value of the earmarked pixel being in a predetermined range; (c) adjusting the brightness value of the earmarked pixel, the adjustment being either to increase or decrease the brightness value; and (d) storing watermarked text information in a storing unit.

Another digital watermarking method is further provided. The method includes the steps of: (a) obtaining text information to be watermarked, the text information including one or more background images each of which includes a plurality of pixels, and each pixel having a brightness value; (b) obtaining a background image from the obtained text information; (c) earmarking a pixel of the obtained background image to be adjusted if a length of a bit sequence is not equal to zero and the brightness value of the pixel is in a predetermined range, the bit sequence being for indicating copyright, author, etc; (d) adjusting the brightness value of the earmarked pixel according to a bit value of one bit of the bit sequence; (e) recording the adjusted pixel and corresponding bit value; and (f) storing watermarked text information.

Other advantages and novel features will be drawn from the following detailed description with reference to the attached drawings, in which:

DETAILED DESCRIPTION

Figure 1:
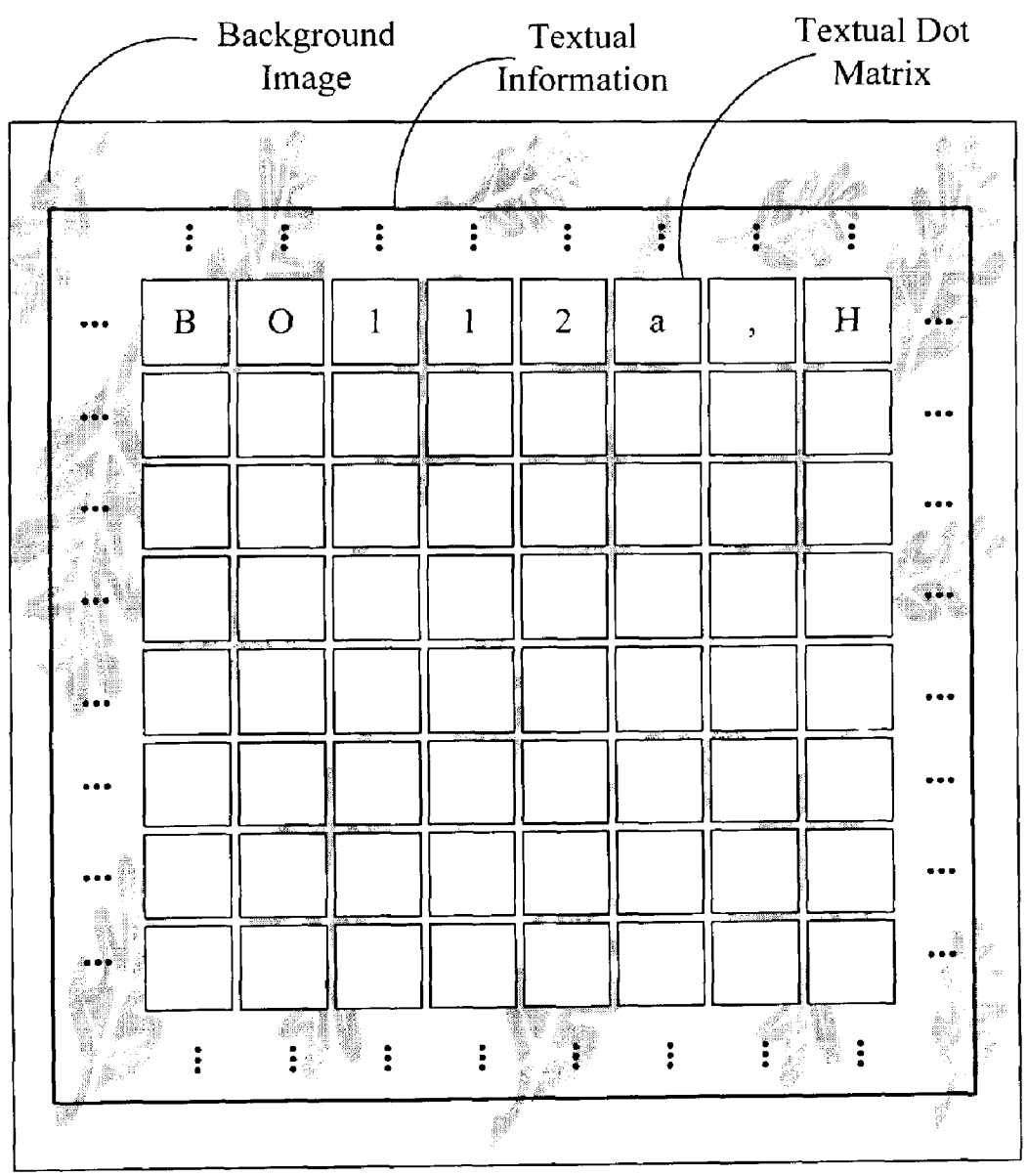
FIG. 1 is a schematic diagram of an exemplary text information in accordance with a preferred embodiment of the present invention, the text information including a background image and textual information, and the textual information including a plurality of textual dot matrixes.

FIG. 1 is a schematic diagram of an exemplary text information in accordance with a preferred embodiment of the present invention. The text information includes a background image and textual information. The textual information includes a plurality of textual dot matrixes, and the background image includes a plurality of pixels (not labeled). Furthermore, each of the pixels has a brightness value expressed as a combination of red, green, and blue ("RGB") colorants. Colorant values of each pixel typically are represented as multi-bit digital data values. Thus, if eight bits are used for each colorant, the colorant values may range from 0 to 255 (namely from black to white). Consequently, the brightness value may also range from 0 to 255 (namely from dark to bright).

Figure 2:
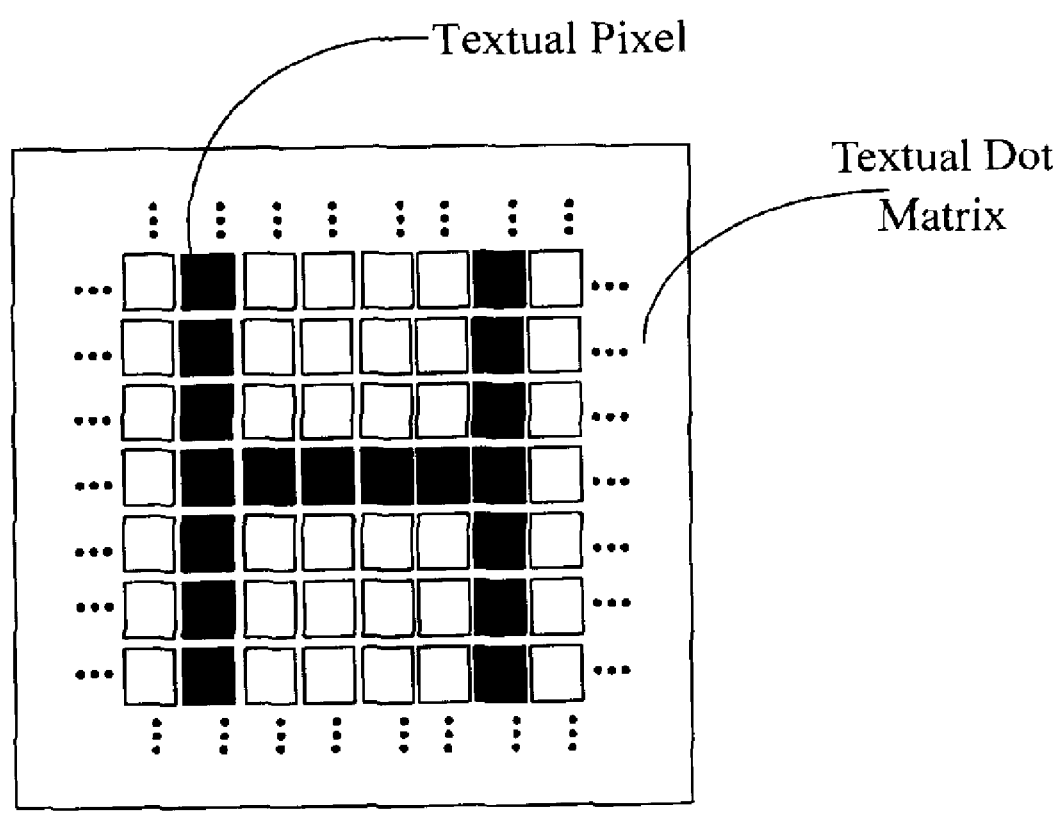
FIG. 2 is a schematic diagram of an exemplary textual dot matrix of the textual information of FIG. 1, the textual dot matrix including a plurality of textual pixels.

FIG. 2 is a schematic diagram of an exemplary textual dot matrix of the textual information of FIG. 1. The textual dot matrix includes a plurality of textual pixels each being represented by a dark square. Each textual pixel, as well as the pixel of the background image, has a brightness value. For convenience and simplicity, in the preferred embodiment, the brightness values of the textual pixels are designated as 0, such as that shown of the dark squares. However, the brightness values of the textual pixels can be designated different values in other embodiments.

Accordingly, in order to distinguish the textual pixels from the pixels of the background image, the brightness values of the pixels of the background image are greater than the brightness values of the textual pixels. Therefore, the brightness values of the pixels of the background image should be in an appropriate range. For simplicity, in this description, the range is from 128 to 255. However, the range can be different in other embodiments.

Figure 3:
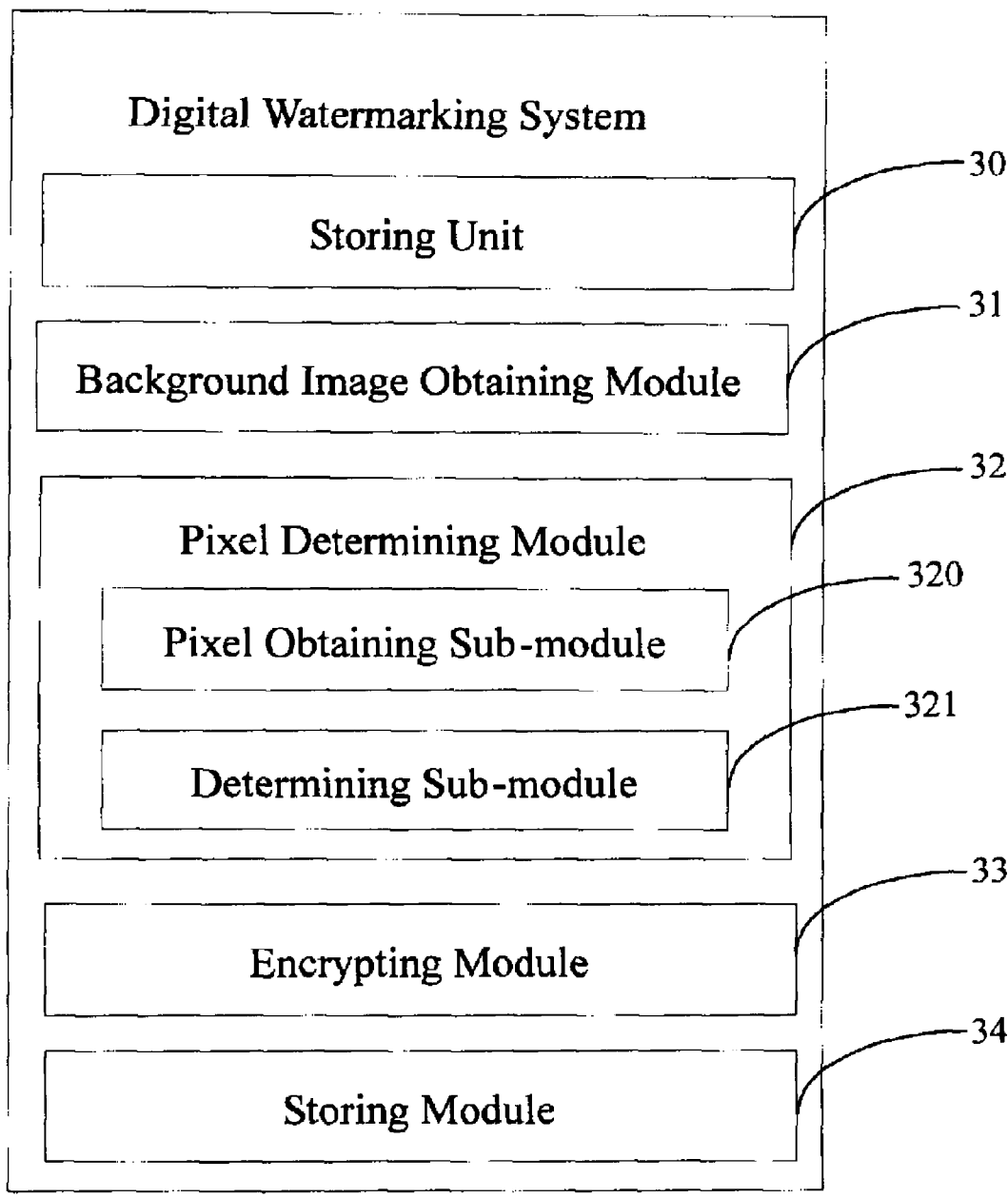
FIG. 3 is a schematic diagram of main function modules of a digital watermarking system in accordance with a preferred embodiment of the present invention.

FIG. 3 is a schematic diagram of main function modules of a digital watermarking system in accordance with a preferred embodiment of the present invention. The digital watermarking system mainly includes a storing unit 30, a background image obtaining module 31, a pixel determining module 32, an encrypting module 33, and a storing module 34. The storing unit 30 is provided for storing text information and bit sequences. The text information includes textual information and one or more background images. The bit sequences are the instructions for watermarking the background images. The background image obtaining module 31 is for obtaining the background image to be watermarked from the storing unit 30.

The pixel determining module 32 is for determining pixels of the obtained background image to be adjusted. As described above, the initial brightness values of these pixels before adjusting are in the range [128,255] so as to distinguish the textual pixels from the pixels of the background image. In addition, the brightness values of the background image pixels preferably do not have outstanding, tremendous changes (e.g., from 255 to 0, namely from bright to black, etc.) that may impact on viewing the textual information. Therefore, the brightness value difference between these pixels before adjusting and the textual pixels preferably not exceeds a threshold, e.g. 208. That is, the brightness values of these pixels before adjusting are in the range [128, 208]. However, the brightness value difference (namely the threshold) can be different in other embodiments, accordingly, the rang of the brightness values of these pixels before adjusting can be different in other embodiments. Further, the brightness values of these pixels after adjusting are preferably in the range [128, 255] so as to likewise distinguish the textual information from the background image.

The pixel determining module 32 further includes a pixel obtaining sub-module 320 and a determining sub-module 321. The pixel obtaining sub-module 320 is for obtaining the pixels to be adjusted. The determining sub-module 321 is for determining the brightness value of each obtained pixel; namely, for determining whether the obtained pixel is in the range [128, 208]. In such case, the obtained pixel is considered to be suitable for watermarking. In this description, this kind of obtained pixel is referred to as an earmarked pixel.

The encrypting module 33 is for adjusting the brightness values of earmarked pixels as provided by the pixel determining module 32, according to a predetermined adjustment value. Thereby, the adjusted pixels have different brightness values from the unadjusted, alike pixels, and thus provide a means of watermarking. Furthermore, the adjustment can be either an increase or a decrease in the brightness value. However, the adjusted brightness value should be preferably maintained in the range [128, 255], so as to distinguish the textual information from the background image. The storing module 34 is for storing the watermarked text information in the storing unit 30.

Figure 4:
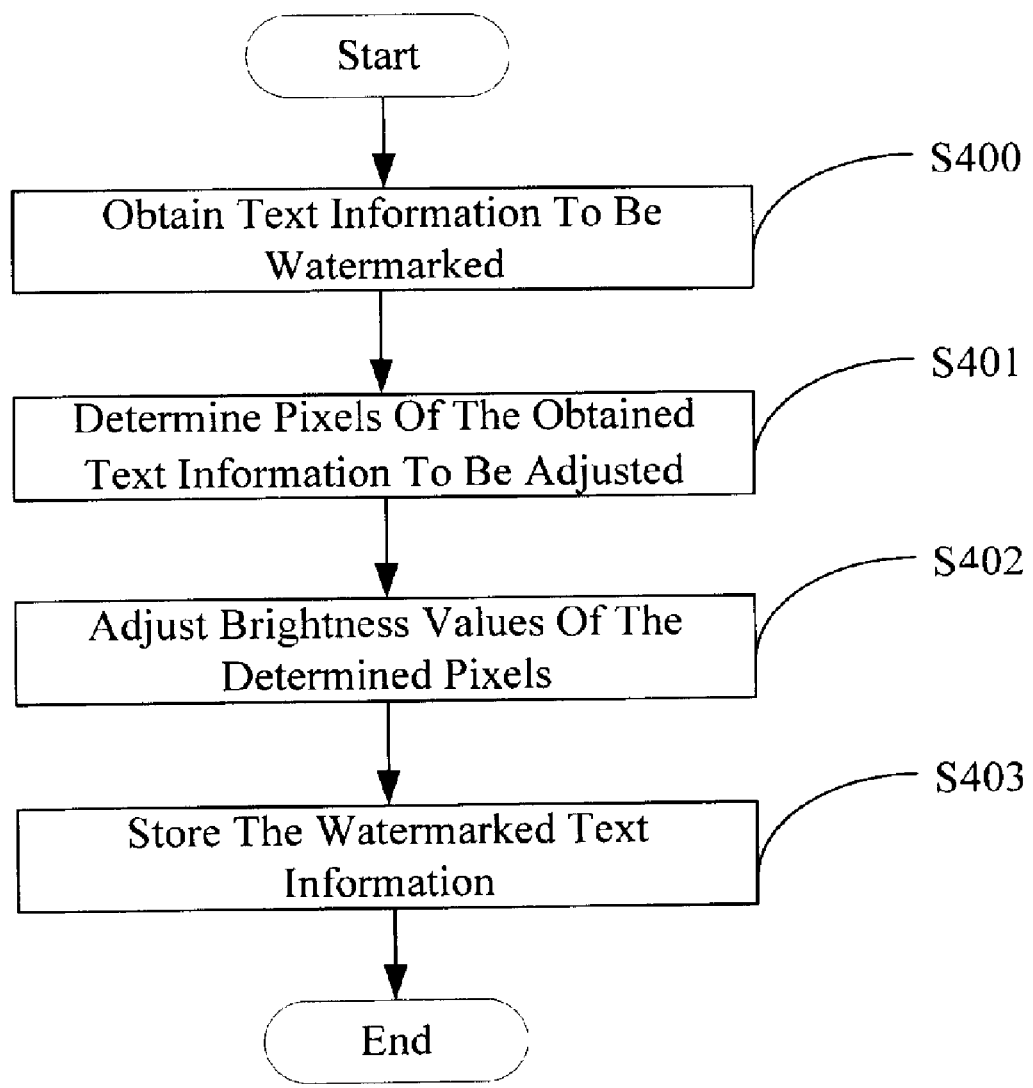
FIG. 4 is a flowchart of a preferred method for digital watermarking in accordance with another embodiment of the present invention.

FIG. 4 is a flowchart of a preferred method for digital watermarking in accordance with the present invention. In step S400, the background image obtaining module 31 obtains text information, e.g., a background image, to be watermarked from the storing unit 30. In step S401, the pixel determining module 32 determines which pixels of the obtained background image are to be adjusted. The initial brightness values of the earmarked pixels preferably are in the range [128, 208]. In step S402, the encrypting module 33 adjusts the brightness values of the earmarked pixels according to a predetermined adjustment value. The adjustment can be either an increase or a decrease in the brightness values. However, the adjusted brightness values should be preferably maintained in a range, e.g., [128, 255]. In step S403, the storing module 35 stores the watermarked text information in the storing unit 30.

Consequently, by utilizing the steps of FIG. 4, the adjusted pixels of the obtained background image have different brightness values from the unadjusted, alike pixels thereof. Thereby, the adjusted pixels are represented in different brightness values, and are perceptually different from the unadjusted, alike pixels. The brightness differences between the adjusted pixels and the unadjusted pixels can be easily distinguishable by sight.

Figure 5:
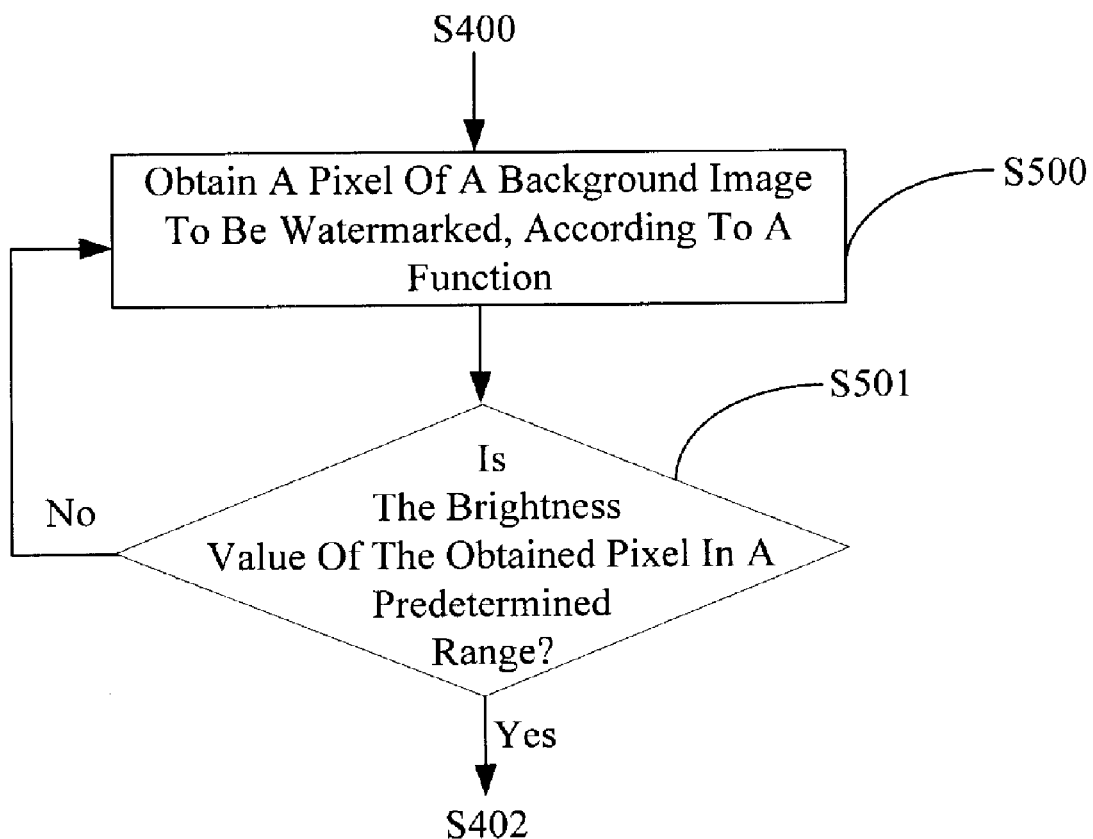
FIG. 5 is a flowchart of a preferred method of implementing one step of FIG. 4, namely determining pixels to be adjusted.

FIG. 5 is a flowchart of a preferred method of implementing step S401 of FIG. 4, namely determining pixels to be adjusted. In step S500, the pixel obtaining sub-module 320 obtains a pixel of the obtained background image from the background image obtaining module 31, according to a function as would be known to persons skilled in the relevant art(s). In step S501, the determining sub-module 321 determines whether the brightness value of the obtained pixel is in the range [128, 208]. If the brightness value of the obtained pixel is not in the range [128, 208], the procedure goes back to step S500 to obtain a different pixel. Conversely, if the brightness value of the obtained pixel is in the range [128, 208], the procedure goes to step S402 described above. Therefore, by utilizing the steps of FIG. 5, an appropriate, preferred pixel is obtained.

Figure 6:
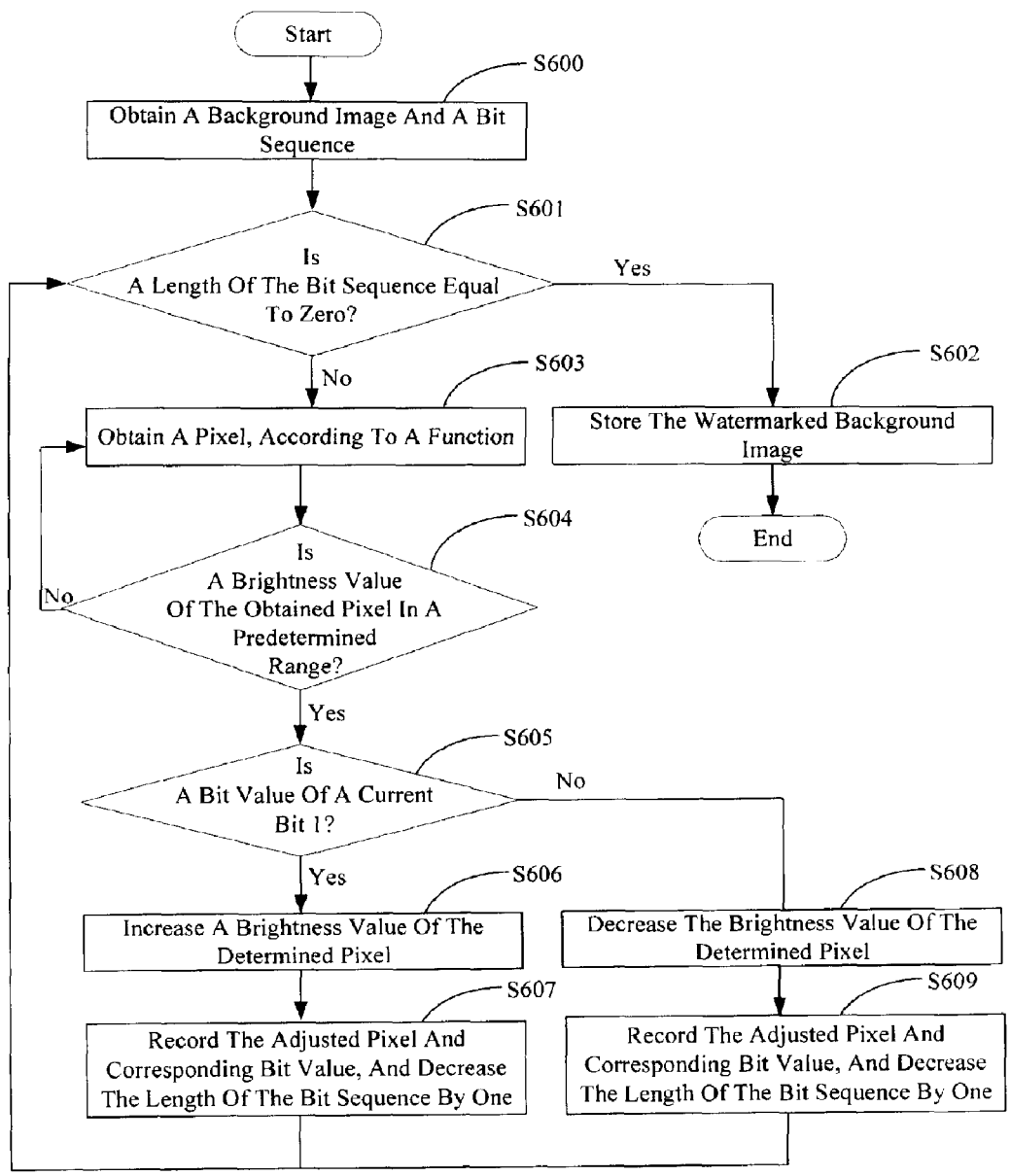
FIG. 6 is a flowchart further detailing steps involved in digital watermarking utilizing a combination of the preferred methods of FIGS. 4 and 5.

FIG. 6 is a flowchart further detailing steps involved in digital watermarking utilizing a combination of the preferred methods of FIGS. 4 and 5. In step S600, the background image obtaining module 31 obtains a background image to be watermarked and a bit sequence for watermarking from the storing unit 30. The bit sequence may be information indicative of copyright, author, etc. In step S601, the determining sub-module 321 determines whether a length of the bit sequence is equal to zero. If the length of the bit sequence is equal to zero, in step S602, the storing module 34 stores the watermarked background image and the procedure is finished. If the length of the bit sequence is not equal to zero, in step S603, the pixel obtaining sub-module 320 obtains a pixel from the obtained background image according to the function. In step S604, the determining sub-module 321 determines whether the brightness value of the obtained pixel is in the range [128, 208]. If the brightness value of the obtained pixel is not in the range [128, 208], the procedure goes back to step S603 to obtain a new pixel. If the brightness value of the obtained pixel is in the range [128, 208], in step S605, the determining sub-module 321 determines whether a bit value of a current obtained bit of the bit sequence is a first value, for example, '1'.

If the bit value of the current obtained bit is '1', in step S606, the encrypting module 33 increases the brightness value of the earmarked pixel according to a predetermined adjustment value. Thereby, an adjusted pixel is generated. In step S607, the storing module 34 records the adjusted pixel and the corresponding bit value (i.e., '1'), and decreases the length of the bit sequence by one, whereupon the procedure goes back to step S601. Conversely, if the bit value of the current obtained bit is '0', in step S608, the encrypting module 33 decreases the brightness value of the earmarked pixel according to the predetermined adjustment value. Thereby, an adjusted pixel is generated. In step S609, the storing module 34 records the adjusted pixel and the corresponding bit value (i.e., '0'), and decreases the length of the bit sequence by one, whereupon the procedure goes back to step S601.

Figure 7:
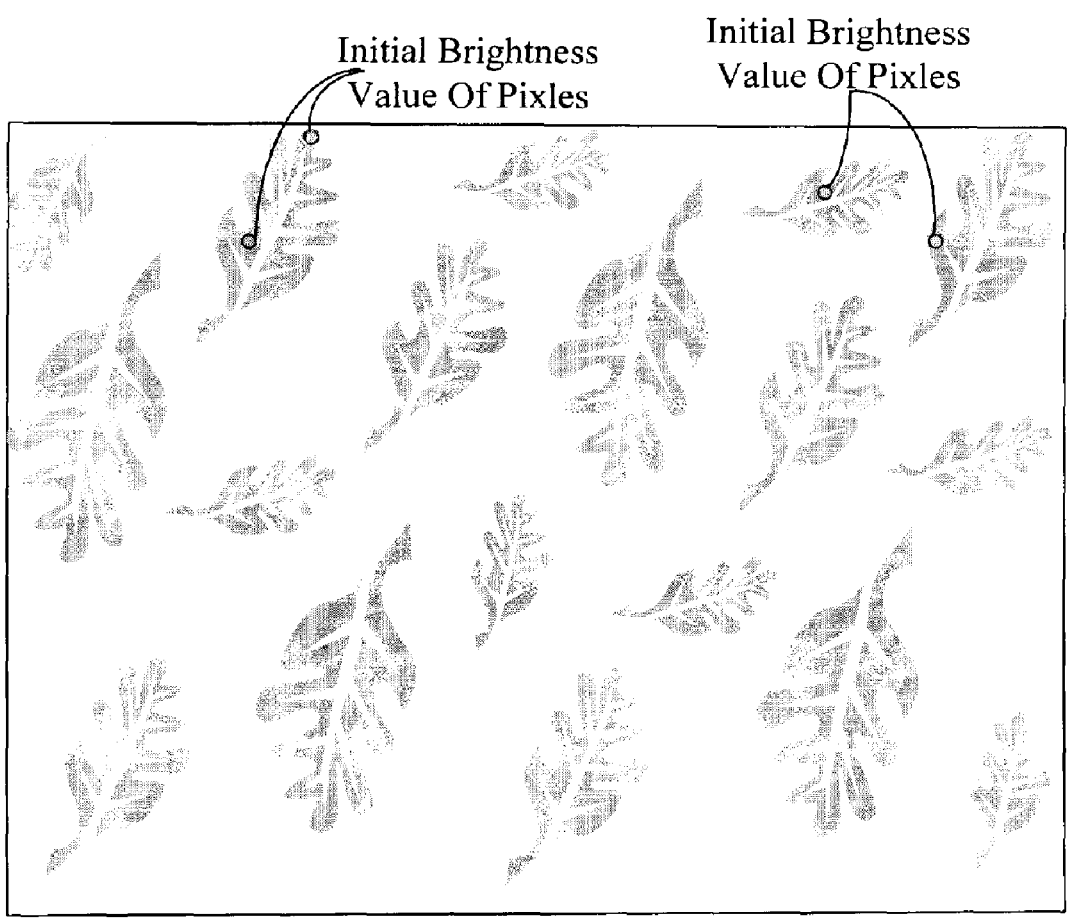
FIG. 7 is a schematic diagram showing normal display states of pixels of the background image of FIG. 1 before watermarking, showing four pixels which are earmarked for adjustment.

FIG. 7 is a schematic diagram showing normal display states of pixels of the background image of FIG. 1 before watermarking, showing four pixels which are earmarked for adjustment. For simplicity, four circled pixels are designated as the earmarked pixels to be adjusted. The initial brightness values of the four pixels are in the range [128, 208]. Accordingly, the brightness value difference between the four pixels and the textual pixels does not exceed the threshold.

Figure 8:
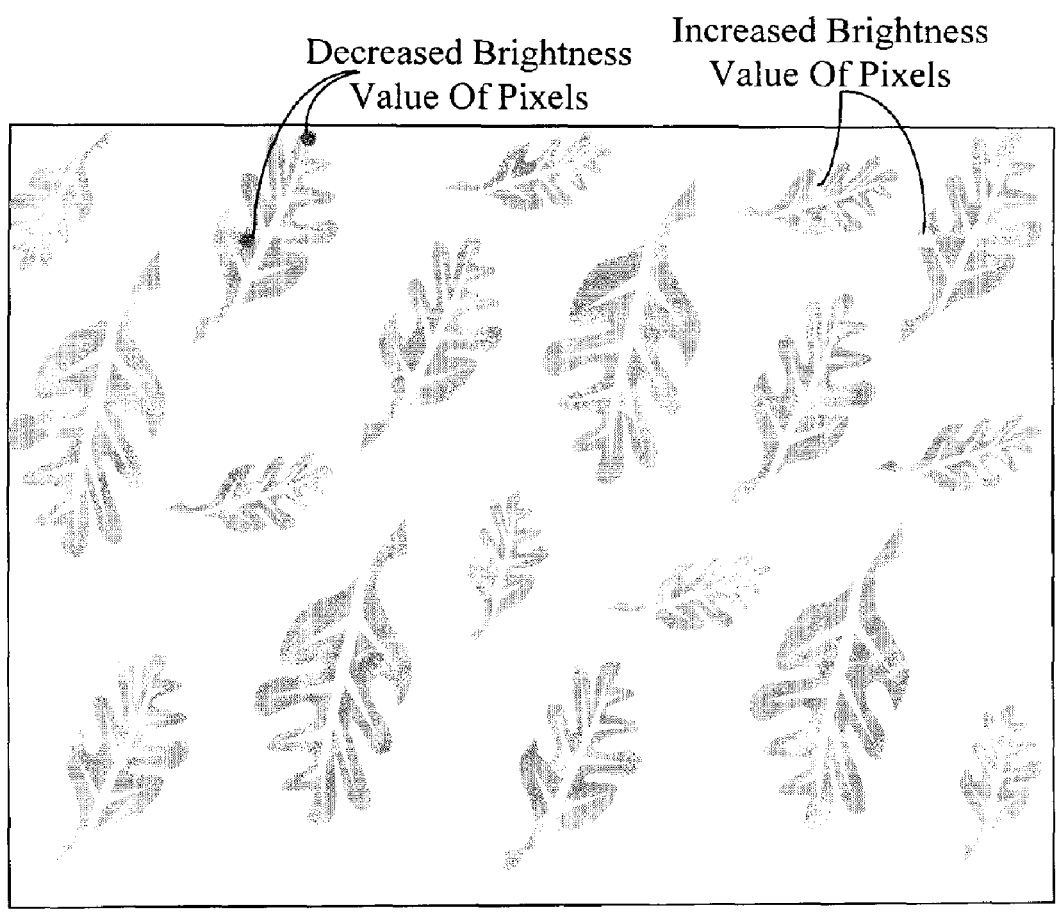
FIG. 8 is similar to FIG. 7, but showing the display states of the pixels after the four earmarked pixels have been adjusted.

FIG. 8 is similar to FIG. 7, but showing the display states of the pixels after the four earmarked pixels have been adjusted. Upon watermarking, the brightness values of two pixels thereof are increased and the brightness values of the other two pixels thereof are decreased, thereby generating four adjusted pixels.

Figure 9:
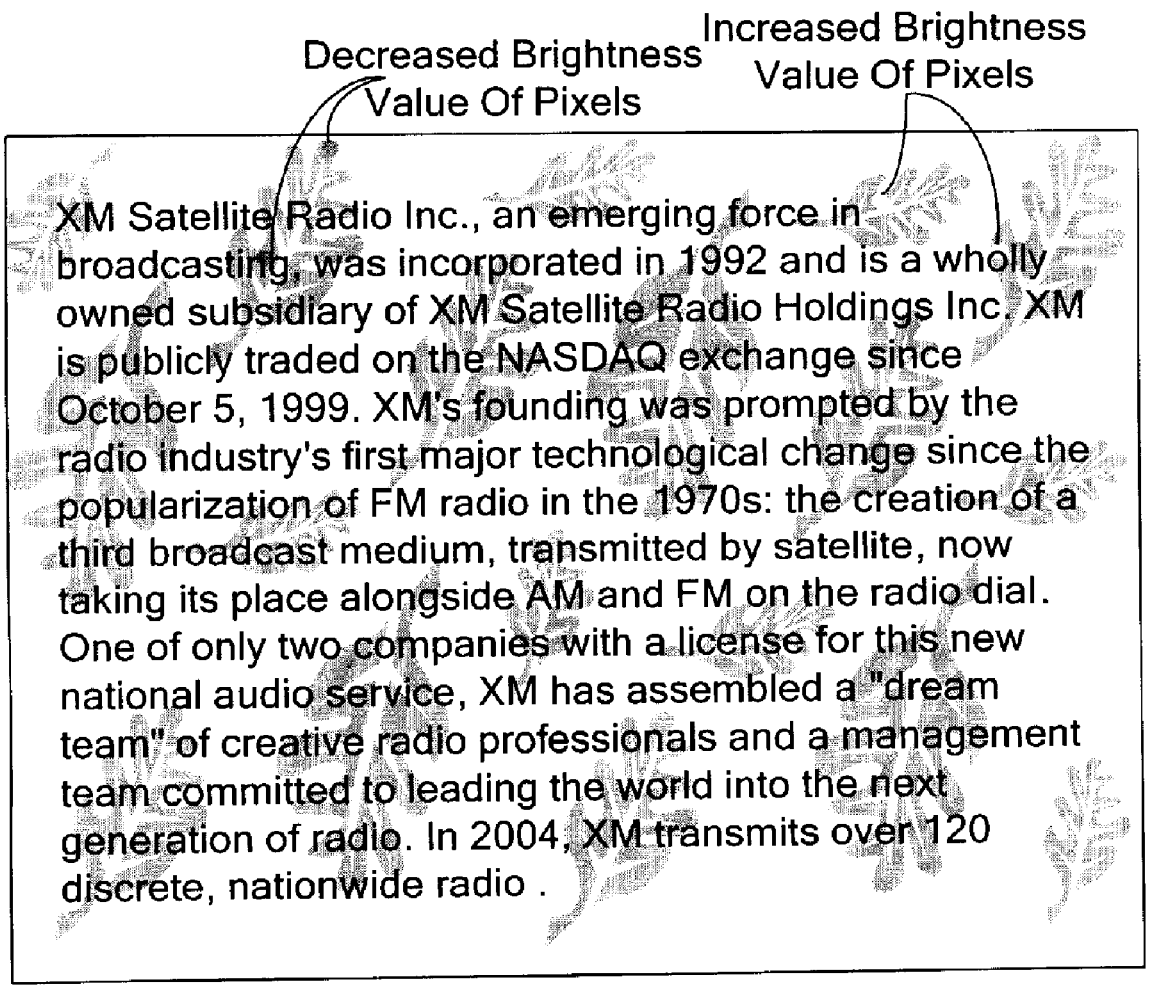
FIG. 9 illustrates a part of an exemplary watermarked text information and adjustment results of a part of a watermarked background image thereof obtained by utilizing the method of FIG. 6.

FIG. 9 illustrates a part of an exemplary watermarked text information and adjustment results of a part of a watermarked background image thereof obtained by utilizing the method of FIG. 6. By utilizing the steps of FIG. 6 described above, a background image is watermarked. A text information including the watermarked background image is regarded as a watermarked text information. For the sake of simplicity, in FIG. 9, a part of the watermarked background image is illustrated, that is, four adjusted pixels are illustrated therein. As described above, the brightness values of the determined pixels can be either increased or decreased. Accordingly, the adjusted pixel can be displayed in either a darker mode or a brighter mode, as compared to the unadjusted, alike pixels. Consequently, the adjusted pixels are distinguishable from the unadjusted, alike pixels by sight. This means the corresponding background image has a visible difference from the normal unwatermarked background image. Accordingly, the text including watermarked background image has a visible difference from the text including normal unwatermarked background image. Thereby, pirates who reproduce the text reproduce the digital watermark, and it is easier for the pirated text to be traced back to the master copy of the text.

It is to be noted that although the present invention has been specifically described on the basis of preferred embodiments and preferred methods, the invention is not to be construed as being limited thereto. Various changes or modifications may be made to the embodiment and methods without departing from the scope and spirit of the invention.

What is claimed is:

1. A digital watermarking system comprising: a storing unit for storing text information, the text information comprising textual information and one or more background images, the textual information comprising a plurality of textual dot matrixes; a background image obtaining module, for obtaining a background image to be watermarked from the storing unit, wherein the background image comprises a plurality of pixels, and each of the pixels has a brightness value; a pixel determining module for earmarking a pixel to be adjusted, wherein an initial brightness value of the earmarked pixel is in a predetermined range; an encrypting module, for adjusting the brightness value of the earmarked pixel; and a storing module, for storing watermarked text information in the storing unit; wherein the pixel determining module is further configured for earmarking a pixel of the obtained background image, if a length of a bit sequence is not equal to zero and the brightness value of the pixel is in a predetermined range, the bit sequence comprises an instruction for watermarking the text information; the encrypting module is further used for adjusting the brightness value of the earmarked pixel according to a bit value of one bit of the bit sequence; and the storing module is further used for recording the adjusted pixel and corresponding bit value.

2. The digital watermarking system according to claim 1, wherein the adjusted brightness value of the earmarked pixel is maintained in the predetermined range.

3. The digital watermarking system according to claim 2, wherein the pixel determining module further comprises a pixel obtaining sub-module and a determining sub-module, the pixel obtaining sub-module obtains a pixel to be adjusted, and the determining sub-module determines the initial brightness value of the obtained pixel.

4. The digital watermarking system according to claim 3, wherein the pixel obtaining sub-module is used for obtaining a new pixel to be adjusted if the initial brightness value of the obtained pixel is out of the predetermined range.

5. A digital watermarking method comprising the steps of: obtaining text information to be watermarked, wherein the text information comprises textual information and one or more background images, the textual information comprises a plurality of textual dot matrixes, each of the background images comprises a plurality of pixels, and each of the pixels has a brightness value; obtaining a background image from the obtained text information; earmarking a pixel of the obtained background image, if a length of a bit sequence is not equal to zero and the brightness value of the pixel is in a predetermined range, wherein the bit sequence comprises an instruction for watermarking the text information; adjusting the brightness value of the earmarked pixel according to a bit value of one bit of the bit sequence; recording the adjusted pixel and corresponding bit value; and storing watermarked text information.

6. The digital watermarking method according to claim 5, wherein the step of adjusting the brightness value of the earmarked pixel according to a bit value of one bit of the bit sequence further comprises the steps of: increasing the brightness value of the earmarked pixel if the bit value is equal to a first value; or decreasing the brightness value of the earmarked pixel if the bit value is equal to a second value.

7. The digital watermarking method according to claim 6, the adjusted brightness value of the earmarked pixel is maintained in the predetermined range.

8. The digital watermarking system according to claim 1, wherein the adjustment of the brightness value of the earmarked pixel is increasing the brightness value of the earmarked pixel if the bit value is equal to a first value, or decreasing the brightness value of the earmarked pixel if the bit value is equal to a second value.

* * * * *